(12) United States Patent
Conley et al.

(10) Patent No.: US 8,001,325 B2
(45) Date of Patent: Aug. 16, 2011

(54) MEMORY CARD THAT SUPPORTS FILE SYSTEM INTEROPERABILITY

(75) Inventors: Kevin Conley, San Jose, CA (US); Robert Chang, Danville, CA (US); Wes G. Brewer, Menlo Park, CA (US); Eric Bone, San Mateo, CA (US); Yoram Cedar, Cupertino, CA (US)

(73) Assignee: SanDisk Corporation, Sunnyvale, CA (US)

( * ) Notice: Subject to any disclaimer, the term of this patent is extended or adjusted under 35 U.S.C. 154(b) by 231 days.

(21) Appl. No.: 10/754,483

(22) Filed: Jan. 9, 2004

(65) Prior Publication Data

US 2005/0154819 A1 Jul. 14, 2005

(51) Int. Cl.
*G06F 12/00* (2006.01)
*G06F 13/00* (2006.01)
*G06F 13/28* (2006.01)

(52) U.S. Cl. ........................................ 711/115; 711/103

(58) Field of Classification Search .............. 711/2, 103, 711/115, 170–173, 203, 209, 221
See application file for complete search history.

(56) References Cited

U.S. PATENT DOCUMENTS

| | | | |
|---|---|---|---|
| 5,860,082 A | 1/1999 | Smith et al. | |
| 5,935,228 A | 8/1999 | Shinomura | 710/102 |
| 6,185,666 B1 * | 2/2001 | Murray et al. | 711/173 |
| 6,266,720 B1 * | 7/2001 | Kakinoki | 710/63 |
| 6,459,644 B2 | 10/2002 | Mizushima et al. | |
| 6,470,414 B2 | 10/2002 | Kuo et al. | |
| 6,519,762 B1 * | 2/2003 | Colligan et al. | 717/170 |
| 2002/0188812 A1 | 12/2002 | Sadhasivan et al. | |
| 2004/0019736 A1 * | 1/2004 | Kim et al. | 711/103 |
| 2004/0107316 A1 * | 6/2004 | Moro | 711/115 |
| 2004/0123059 A1 * | 6/2004 | Suda | 711/163 |

FOREIGN PATENT DOCUMENTS

| | | |
|---|---|---|
| JP | 2002-074314 | 3/2002 |
| JP | 2002-74314 | 3/2002 |
| TW | 531752 | 5/2003 |

OTHER PUBLICATIONS

International Search Report and Written Opinion for corresponding PCT application No. PCT/US2004/043683 mailed Nov. 11, 2005.
Examination Report dated Feb. 12, 2007 for related European Patent Application No. 04815698.8.
Chinese Office Action in corresponding Chinese Patent Application No. 200480042213.5.
Office Action dated Apr. 28, 2009 from European Application No. 04815698.8.
Office Action dated Apr. 10, 2009 from Chinese Application No. 200480042213.5.
Chinese Office Action dated Aug. 28, 2009 from Chinese Application No. 200480042213.5.
European Office Action dated Aug. 5, 2009 from European Application No. 09165816.1.
Office Action dated Sep. 21, 2010 in JP Application No. 2006-549320.
Office Action dated Dec. 29, 2010 in TW Application No. 094100402.

* cited by examiner

*Primary Examiner* — Yaima Campos
(74) *Attorney, Agent, or Firm* — Beyer Law Group LLP

(57) ABSTRACT

A removable data storage device that intelligently operates as one large data storage region or as multiple, smaller data storage regions is disclosed. The removable data storage device can be used in not only modern electronic products (using 32-bit addressing) but also legacy products (using 16-bit addressing). A host device can couple to the removable storage device to access data stored in/to the removable storage device. As an example, the removable data storage device can be a memory card.

9 Claims, 6 Drawing Sheets

MEMORY CARD THAT SUPPORTS FILE SYSTEM INTEROPERABILITY

BACKGROUND OF THE INVENTION

1. Field of the Invention

The present invention relates to data storage and, more particularly, to memory cards that provide data storage.

2. Description of the Related Art

Memory cards are commonly used to store digital data for use with various products (e.g., electronics products). Examples of memory cards are flash cards that use Flash type or EEPROM type memory cells to store the data. Flash cards have a relatively small form factor and have been used to store digital data for products such as cameras, hand-held computers, set-top boxes, hand-held or other small audio players/recorders (e.g., MP3 devices), and medical monitors. A major supplier of flash cards is SanDisk Corporation of Sunnyvale, Calif.

A conventional memory system can be represented, for example, by a memory card (e.g., flash card) format. A conventional memory system includes a memory controller and various memory chips. The number of memory chips is dependent upon the storage capacity to be provided by the conventional memory system. The memory controller receives an input voltage ($V_{IN}$) and an Input/Output (I/O) bus. The memory controller operates to supply an address/data/control bus to each of the memory chips. In addition, the memory controller can produce chip select signals that are provided to chip enable terminals of each of the memory chips. The memory controller uses the chip select signals to selectively activate one of the memory chips that is to be accessed for data storage or retrieval. In addition, since the memory chips require various voltage levels for operation, the memory controller can include a charge pump and regulation circuit. Alternatively, each of the memory chips can themselves include a charge pump and regulation circuit. The charge pump and regulation circuit can produce several different output voltage levels that are supplied to each of the memory chips. As an example, the input voltage ($V_{IN}$) might be 3.3 or 1.8 Volts and the different output voltage levels might be 3 Volts, 6 Volts, 12 Volts and 24 Volts.

Memory cards are removable storage media that are highly portable due to their relatively small form factor. As previously noted, memory cards have been used to store digital data for products such as cameras, hand-held computers, set-top boxes, hand-held or other small audio players/recorders (e.g., MP3 devices), and medical monitors. These products are also referred to as host devices.

Traditionally, host devices have utilized a file system configuration that supports sixteen bit (16-bit) addressing. The 16-bit addressing was inherited from the popular Disk Operating System (DOS) environment. Unfortunately, the 16-bit addressing has a maximum addressable address space of two (2) gigabytes (GBs). This presents a problem because the data storage capacity of memory cards is, or will soon be, able to exceed two gigabytes. Consequently, host devices using the common 16-bit addressing would be unable to utilize any additional memory capacity provided by the memory card that is beyond two gigabytes.

More recently, some more sophisticated and more costly host devices use a file system configuration that supports more than sixteen bits for each allocation unit or cluster. The FAT-32 is an extension of the 16-bit FAT system that uses twenty-eight of the 32-bit address for each allocation unit or cluster. The maximum addressable address space for such is eight (8) terabytes (TBs). Today and for the foreseeable future, the data capacity of a memory card is well below that of even a single terabyte.

Further, memory cards practically need to be able to be used in either a host device using 16-bit addressing or a host device using 32-bit addressing without damage or loss of existing data. In other words, the memory cards need to operate properly regardless of the file system configuration. However, the presence of two different file system configurations can lead to not only inefficient data storage but also unreliable data storage. The unreliable data storage can even result in a loss of data.

Thus, there is a need for improved approaches to extend capacity of memory cards yet reliably support not only older but also modern file systems.

SUMMARY OF THE INVENTION

Broadly speaking, the invention pertains to a removable data storage device that intelligently operates as one large data storage region or as multiple, smaller data storage regions. The removable data storage device can be used in not only modern electronic products (using 32-bit addressing) but also legacy products (using 16-bit addressing). A host device can couple to the removable storage device to access data stored in/to the removable storage device. In general, host devices are electronic devices such as cameras, hand-held computers, set-top boxes, hand-held or other small audio players/recorders (e.g., MP3 devices), and medical monitors.

The invention can be implemented in numerous ways, including as a system, apparatus, device or method. Several embodiments of the invention are discussed below.

As a method for reading data from a memory card that provides non-volatile data storage, one embodiment of the invention includes at least the acts of: accessing volume information from a first volume of non-volatile data storage of the memory card; determining whether one or multiple volumes are present on the memory card based on the volume information; operating the memory card as providing only the first volume when it is determined that one volume is present on the memory card, the non-volatile data storage of the memory card being assigned to the one volume; and operating the memory card as providing a plurality of volumes when it is determined that multiple volumes are present on the memory card, one of the plurality of volumes being the first volume, and the non-volatile data storage being divided amongst the plurality of volumes.

As a memory card capable of being configured as a single partition of a first size or as multiple partitions of a second size, one embodiment of the invention includes at least: non-volatile data storage that provides data storage, the non-volatile data storage being configured to include at least a first partition and to store partition information describing at least the first partition; a switch being set in one of a plurality of switch positions; and a controller that manages access to the data stored in the non-volatile data storage. The controller examines the partition information stored in the non-volatile data storage to determine whether the single partition or the multiple partitions are being used based on the partition information. When the controller determines that the single partition is used, the non-volatile data storage is addressed as a single volume. When the controller determines that the multiple partitions are being used, the non-volatile data storage is addressed as multiple partitions based on the switch position of the switch.

As a memory device that provides non-volatile data storage, one embodiment of the invention includes at least: means for accessing volume information from a first volume of non-volatile data storage of the memory device; means for determining whether one or multiple volumes are present on the memory device based on the volume information; and means for operating the memory card based on a configuration of the memory device into the one or multiple volumes that the means for determining determines to be present on the memory device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to a removable data storage device that intelligently operates as one large data storage region or as multiple, smaller data storage regions. The removable data storage device can be used in not only modern electronic products (using 32-bit addressing) but also legacy products (using 16-bit addressing). A host device can couple to the removable storage device to access data stored in/to the removable storage device. In general, host devices are electronic devices such as cameras, hand-held computers, set-top boxes, hand-held or other small audio players/recorders (e.g., MP3 devices), and medical monitors.

In one embodiment, the removable data storage device is a memory card. As used herein, a memory card includes card-like configurations as well as other configurations that are less card-like, such as memory sticks.

Embodiments of this aspect of the invention are discussed below with reference to FIGS. 1-7. However, those skilled in the art will readily appreciate that the detailed description given herein with respect to these figures is for explanatory purposes as the invention extends beyond these limited embodiments.

Figure 1:
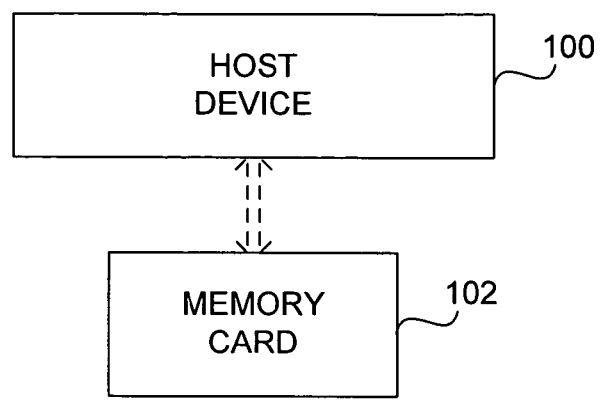
FIG. 1 is a block diagram of a host device together with a memory card.

FIG. 1 is a block diagram of a host device 100 together with a memory card 102. The memory card 102 provides non-volatile data storage for the host device 100. The memory card 102 typically couples to the host device 100 in a removable manner. In one embodiment, the memory card 102 has a connector that couples with a counterpart connector at the host device 100.

The host device 100 can pertain to a computer, a camera, a video recorder, a personal digital assistant, and the like. Since the memory card 102 is removable, the data can be easily transported separate from the host device.

Host devices have traditionally utilized a file system that supports FAT-16 format files. In the FAT-16 format, 16-bit addresses are used to access the maximum addressable address space of two (2) gigabytes (GBs). The data storage capacity of memory cards is, or will soon be, able to exceed two gigabytes. As a result, host devices using the FAT-16 format would be unable to utilize any additional memory capacity provided by the memory card 102 that is beyond two gigabytes.

On the other hand, more sophisticated and more costly host devices 100 use a FAT-32 format for files. The FAT-32 format uses 32-bit addresses to access the maximum addressable address space of eight (8) terabytes (TBs). Today and for the foreseeable future, the data capacity of a memory card is well below that of even a single terabyte.

According to the invention, a memory card is suitable for use with a host device using 16-bit addressing (i.e., a FAT-16 file format) or a host device using 32-bit addressing (i.e., a FAT-32 file format). In either case, storage capacity of the memory card 102 beyond two gigabytes can be utilized. In the case where the host device 100 supports 32-bit addressing, the memory card 102 operates as a single volume formatted for FAT-32 files. On the other hand, when the host device 100 supports 16-bit addressing, the memory card 102 is partitioned into multiple volumes, each volume being formatted for FAT-16 files and providing data storage capacity for up to two gigabytes.

To facilitate switching between the multiple volumes, the memory card 102 can include a switch. The user can interact with the switch to select which of the available volumes within the memory card 102 is to be utilized by the host device 100.

Figure 2:
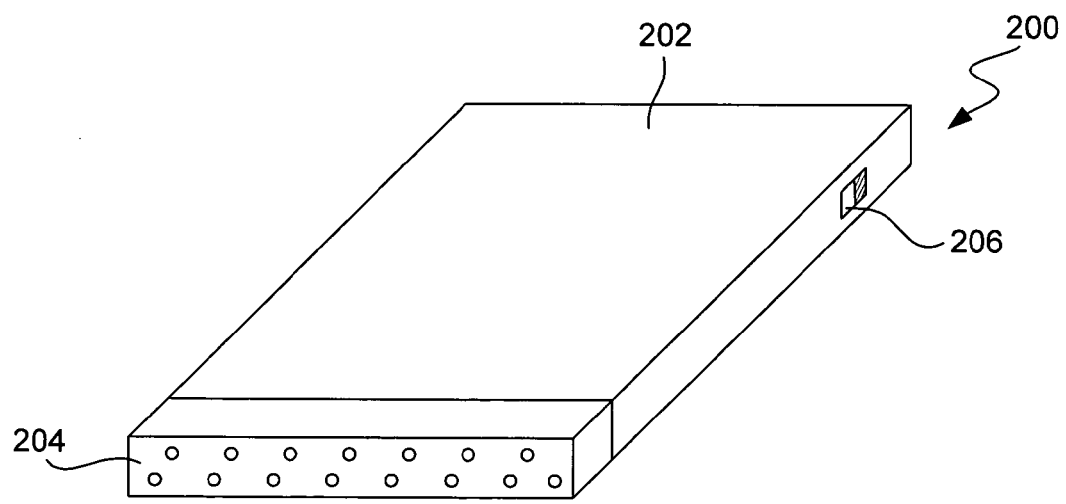
FIG. 2 is a perspective diagram of a memory card according to one embodiment of the invention.

FIG. 2 is a perspective diagram of a memory card 200 according to one embodiment of the invention. The memory card 200 is one representative embodiment for the memory card 102 shown in FIG. 1.

The memory card 200 includes a housing 202 for the memory card 200. The housing 202 serves as a protective cover for the circuitry and/or components within the memory card 200. The memory card 200 also includes a connector end 204 that interconnects with a corresponding connector at a host device. The host device is defined to include any peripheral devices thereof. Still further, according to the invention, the memory card 200 includes a switch 206. As shown in FIG. 2, the switch 206 has two positions and is suitable for use with a memory card that provides two different volumes in the FAT-16 format. Hence, one position of the switch 206 selects a first volume, and a second position of the switch 206 selects a second volume.

It should be understood that the memory card 200 is typically associated with a small form factor. Typically, the form factor is smaller than 2 inches by 3 inches, with a thickness of less than 0.25 inches. The configuration of the memory card 200 can vary widely. Hence, the configuration of the memory card 200 shown in FIG. 2 is not a limitation of the invention but merely a representative embodiment.

Still further, it should be understood that the switch 206 can have more than two positions. For example, if the memory card 200 were partitioned into four volumes, then the switch 206 would require at least three switch positions. As an example, a memory card having sixteen (16) gigabytes of data storage capacity could be partitioned into eight (8) partitions of two (2) gigabytes each, and the associated switch would have three to eight positions depending upon implementation. A memory card could also use more than one switch.

Figure 3:
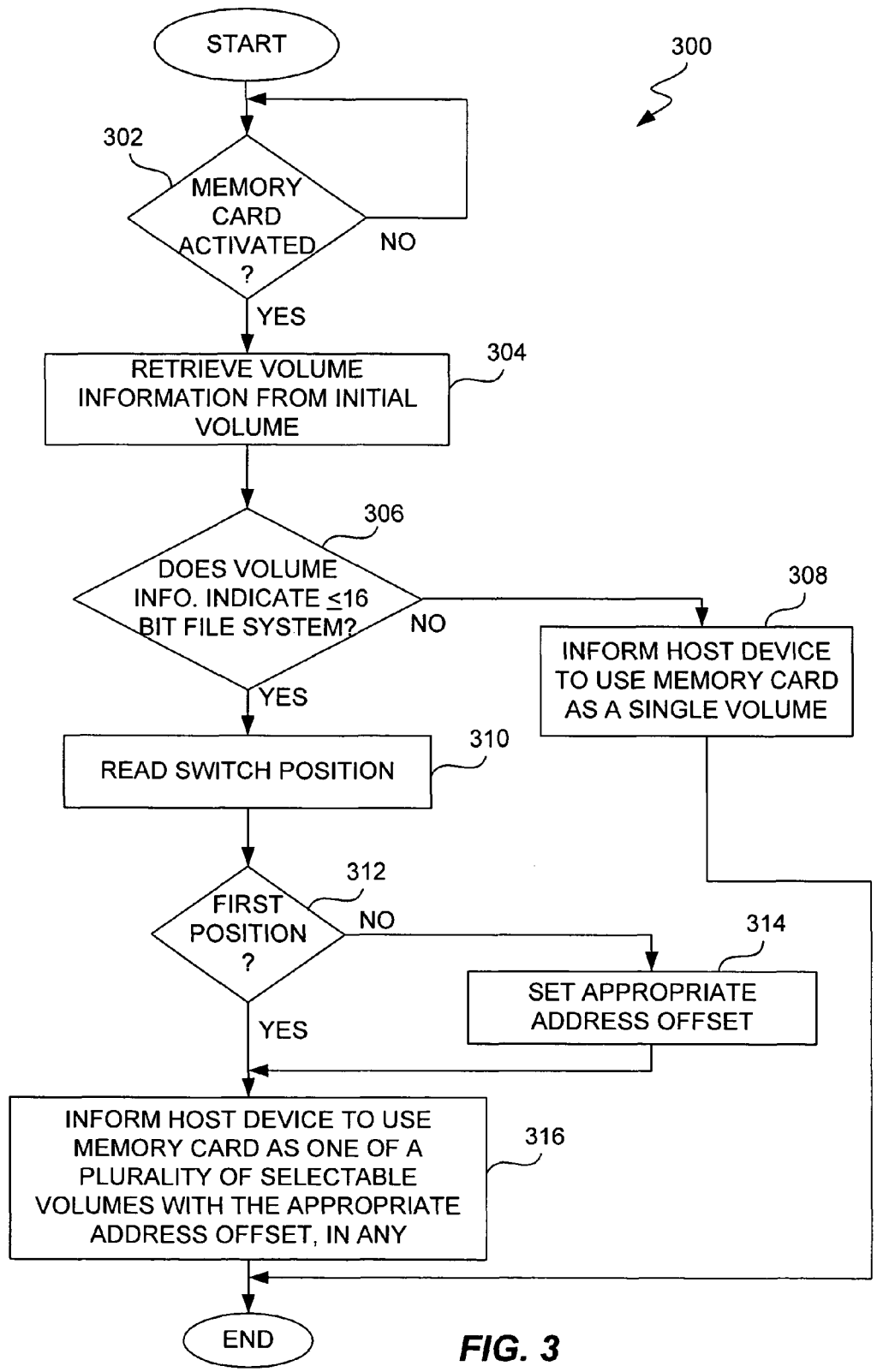
FIG. 3 is a flow diagram of a memory card volume evaluation process according to one embodiment of the invention.

FIG. 3 is a flow diagram of a memory card volume evaluation process 300 according to one embodiment of the invention. The memory card volume evaluation process 300 is, for example, performed by a host controller within a memory card. The host controller communicates with a host (host device) to read or write data to data storage components of the memory card.

The memory card volume evaluation process 300 is initiated when a memory card is activated. Examples of activation of a memory card include (i) powering-on the memory card, or (ii) inserting the memory card into a receptacle of a host device. Initially, a decision 302 determines whether a memory card has been activated. When the decision 302 determines that a memory card has not been activated, then the memory card volume evaluation process 300 awaits such an event. In other words, the memory card volume evaluation process 300 can be invoked when a memory card is activated.

Once the decision 302 determines that a memory card has been activated, then volume information from an initial volume is retrieved 304. Here, the initial volume is a volume (compatible with a file system) that is imposed on data storage components of the memory card. The memory card has previously been formatted for storage of files across one or more volumes. In the case where the memory card has only one volume, the one volume is the initial volume. In the case where the memory card has multiple volumes, the first volume is the initial volume.

Next, a decision 306 determines whether the volume information indicates that the compatible file system is less than or equal to a 16-bit file system. In other words, the decision 306 determines whether the file system is a file system for 16-bit (or less) addressing, i.e., FAT-16 (or less) formatted files. When the decision 306 determines that the volume information indicates that the volume is not a 16-bit (or less) file system, then the host device is informed 308 that the memory card uses a single volume. Here, the file system would then utilize 32-bit addressing and thus the file format for the single volume would be FAT-32 formatted files. On the other hand, when the decision 306 determines that the volume information indicates that the file system is 16-bit or less (i.e., FAT-16), a switch position is read 310. Here, as shown in FIG. 2, the memory card includes the switch 206 that is placed in one of a plurality of different switch positions.

A decision 312 then determines whether the switch position is in a first position. When the decision 312 determines that the switch position is not in a first position, then an appropriate address offset is set 314. In this case, the memory card is partitioned into multiple volumes, and when addressing those volumes other than the first volume, an appropriate address offset is utilized. Alternatively, following the decision 312 when the switch position is in the first position as well as following the operation 314, the host device is informed 316 to use the memory card as one of a plurality of selectable volumes with the appropriate address offset, if any. Here, the memory card does use a plurality of different volumes and the switch position is utilized to select one of the volumes, and, to the extent necessary, the appropriate address offset is provided. Following the operations 308 and 316, the memory card volume evaluation process 300 is complete and ends.

Figure 4:
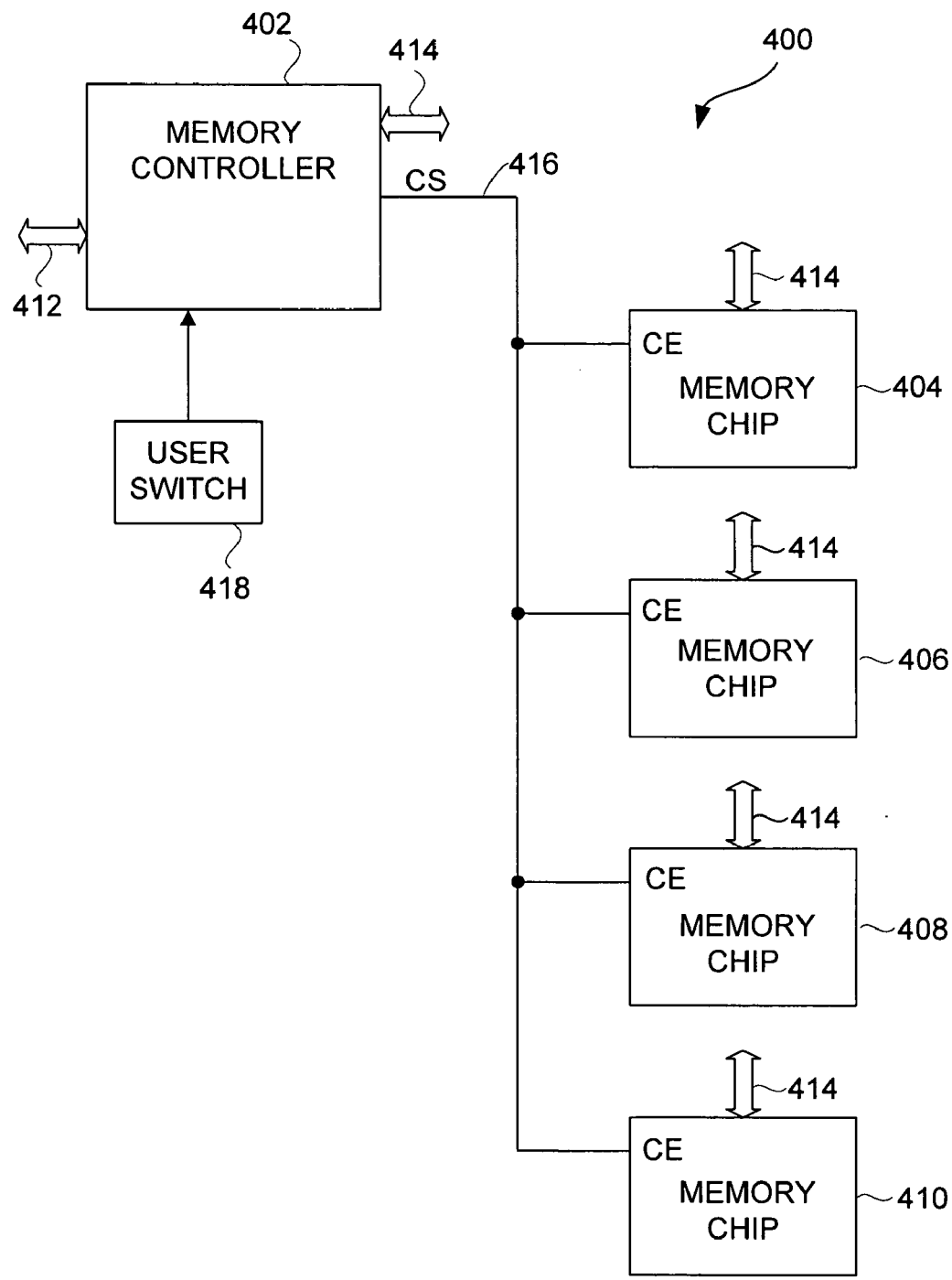
FIG. 4 is a block diagram of a memory system according to one embodiment of the invention.

FIG. 4 is a block diagram of a memory system 400 according to one embodiment of the invention. The memory system 400 represents, for example, a memory card (e.g., flash card).

The memory system 400 is, for example, suitable for use as the memory card 102 shown in FIG. 1 or the memory card 200 shown in FIG. 2.

The memory system 400 includes a memory controller 402 and memory chips 404-410. The number of memory chips 404-410 is dependent upon the storage capacity to be provided by the conventional memory system 400 and the actual memory capacity of each memory chip. The memory controller 402 receives an Input/Output (I/O) bus 412. The memory controller 402 operates to supply an address/data/control bus 414 to each of the memory chips 404-410. In addition, the memory controller 402 produces a chip select (CS) signal 416 that is provided to chip enable (CE) terminals of each of the memory chips 404-410. The memory controller 402 uses the chip select signal 416 to selectively activate one of the memory chips 404-410 that is to be accessed for data storage or retrieval.

The memory system 400 further includes a switch 418. The switch 418 has two or more switch positions that a user can choose from. Different switch positions are used to select different volumes. More particularly, the switch 418 provides an indication of its switch position to the memory controller 402. The memory controller 402 then operates the memory system 400 in accordance with the indication of the switch position.

Figure 5A:
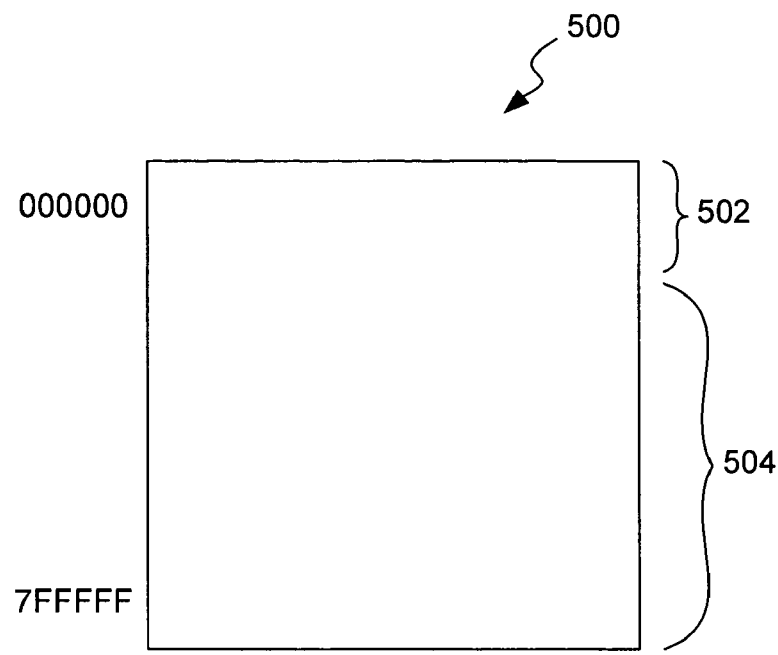
FIG. 5A is a diagram illustrating a single volume address space suitable for use with the invention.

FIG. 5A is a diagram illustrating a single volume address space 500 suitable for use with the invention. The address space represents a four (4) gigabyte range of logical addresses from $000000_{HEX}$ through $7FFFFF_{HEX}$. Within the address space 500 there is stored volume information 502 and host supplied data 504. The volume information 502 contains at least an indication of whether the address space is configured as a FAT-16 file format. Here, the address space covers a four (4) gigabyte range, and thus if a FAT-16 file format were to be utilized with this configuration, only 50% of the available data storage could be utilized. Hence, the address space 500 shown in FIG. 5A is suitable for use with a file system supporting thirty-two bit (32-bit) addressing (i.e., FAT-32 file format).

Figure 5B:
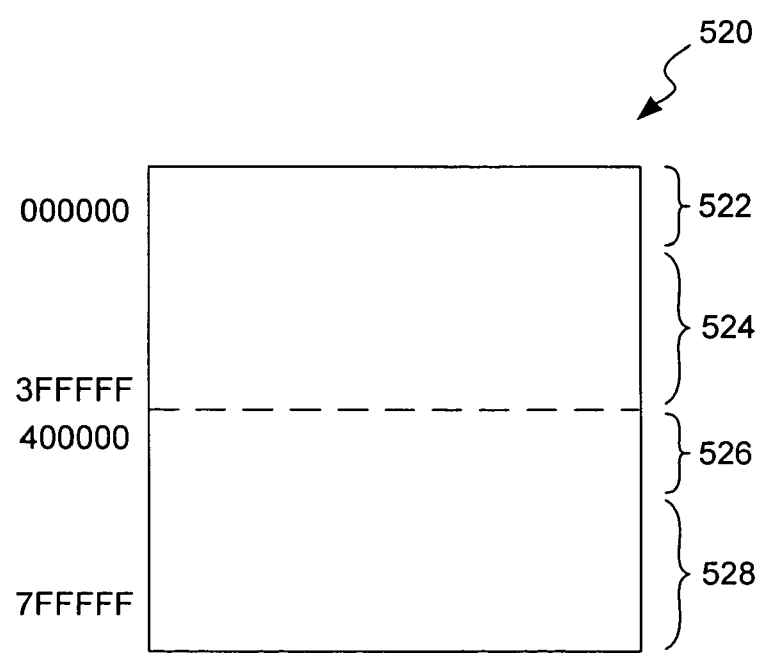
FIG. 5B is a diagram of a multiple volume address space suitable for use with the invention.

FIG. 5B is a diagram of a multiple volume address space 520 suitable for use with the invention. The address space 520 also covers a four (4) gigabyte range, but is divided into a pair of two (2) gigabyte partitions. Namely, the address space 520 is divided into first and second two gigabyte regions. The first two gigabyte region extends from $000000_{HEX}$ to $3FFFFF_{HEX}$, and the second two gigabyte volume extends from $400000_{HEX}$ through $7FFFFF_{HEX}$. Here, the first volume includes volume information 522 and host supplied data 524. Similarly, the second volume includes volume information 526 and host-supplied data 528. Hence, the address space 520 shown in FIG. 5B is suitable for use with a file system supporting sixteen bit (16-bit) addressing (i.e., FAT-16 file format). When the address space 520 is utilized by an associated host device, the host device understands 16-bit addressing, i.e., the FAT-16 format, and can thus address either the first volume or the second volume. The switch, such as the switch 206 shown in FIG. 2, is utilized to cause the host to address either the first volume or the second volume.

By reading the volume information from the memory card, the host device and/or the memory card are able to understand the formatting previously applied to the memory card. For example, if the memory card were configured into first and second volumes similar to that shown in FIG. 5B, then upon reading the volume information 522, the host device and/or the memory card would understand that 16-bit addressing (i.e., the FAT-16 file format) is utilized. Hence, in such case, the host would thereafter access data storage associated with either the first volume or the second volume. In the case of using the second volume, an address offset would be utilized.

Alternatively, if the memory card were configured into only a single volume similar to that shown in FIG. 5A, then upon reading the volume information 502, the host device and/or the memory card would understand that the memory card is formatted for 32-bit addressing, i.e., the FAT-32 file format. As a result, the host device could thereafter access data storage associated with a single volume covering its full range of storage capacity.

Hence, the memory card, according to the invention, provides interoperability with host devices supporting FAT-16 or FAT-32 file systems. As the host devices become more complex and data-hungry, the ability to provide higher capacity memory cards is important. However, it is equally important that the interoperability between FAT-16 and FAT-32 systems be maintained.

Figure 6:
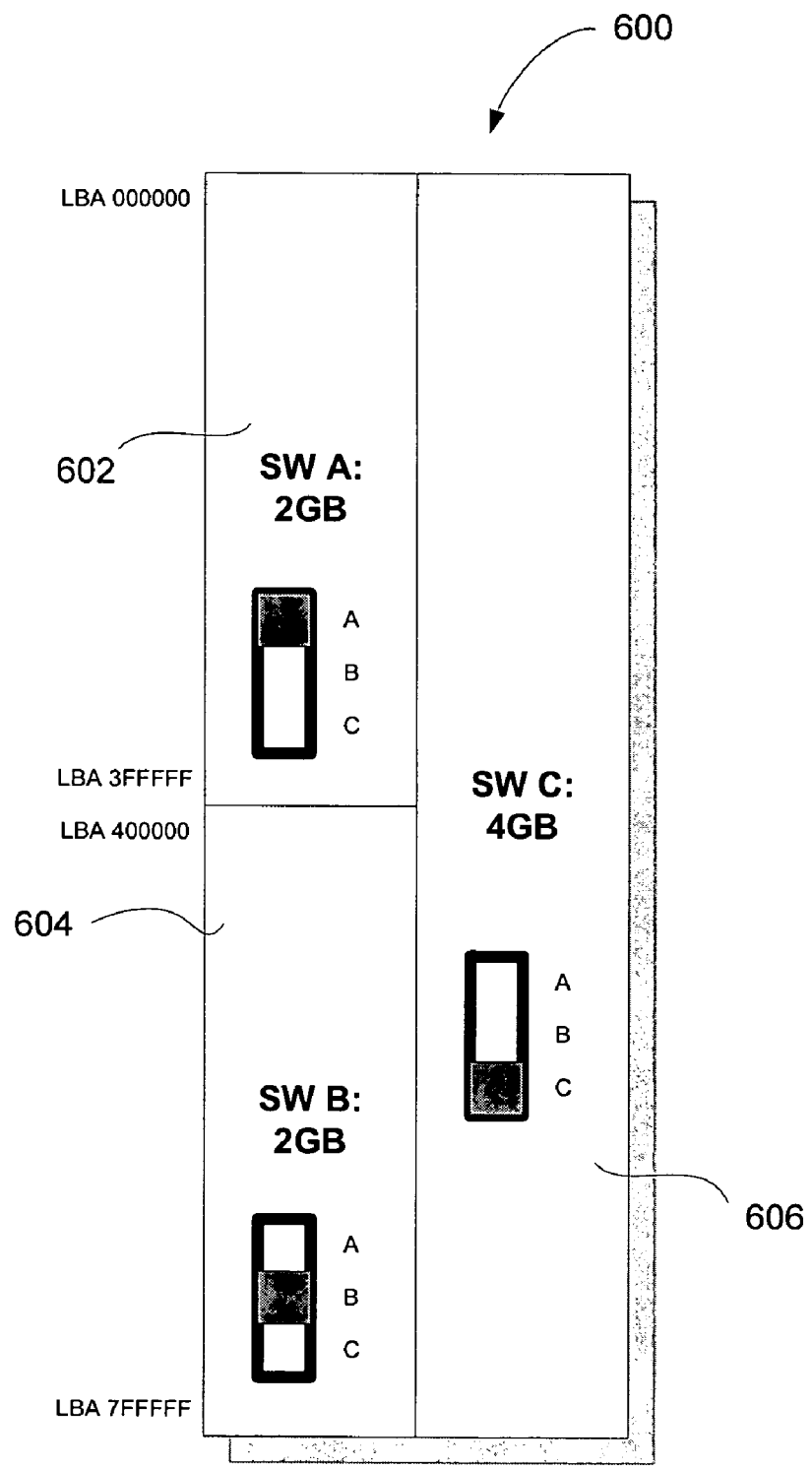
FIG. 6 is a diagram illustrating an additional embodiment of the invention using a three position switch to select one of three possible volume designations.

FIG. 6 is a diagram illustrating different configurations for an address space 600 of a memory card according to another embodiment of the invention. The different configurations represent three different volumes. The appropriate or desired one of the volumes can be selected by a switch position of a three-position switch for the memory card. For example, the switch 206 can be the three-position switch in one embodiment. A first volume 602 has a two (2) gigabyte range of logical addresses from $000000_{HEX}$ through $3FFFFF_{HEX}$. The first volume can be selected by switch position A of the three-position switch for the memory card. A second volume 604 has a two (2) gigabyte range of logical addresses from $4000000_{HEX}$ through $7FFFFF_{HEX}$. The second volume can be selected by switch position B of the switch for the memory card. A third volume 606 has a four (4) gigabyte range of logical addresses from $000000_{HEX}$ through $7FFFFF_{HEX}$. The third volume can be selected by switch position C of the three-position switch for the memory card. When the first or second volumes of the memory card are used, the volume can use FAT-16 or FAT-32 format. However, to use the third volume, the volume must use a FAT-32 format. When the memory card leaves the factory, all three configurations can be invalid. Then, using system information stored on the memory card, the firmware determines whether to use FAT-16 or FAT-32 file format. In this embodiment, the firmware need not utilize system configuration information to determine the appropriate file format/volume. Instead, the firmware determines the appropriate file format/configuration for the memory card based on the switch position. For example, the first volume can use logical addresses from $000000_{HEX}$ through $001023_{HEX}$ for system information in overall logical addresses from $004096_{HEX}$ through $005119_{HEX}$, and can use logical addresses from $001024_{HEX}$ through $4001215_{HEX}$ for data in overall logical addresses from $006144_{HEX}$ through $4007359_{HEX}$.

Figure 7:
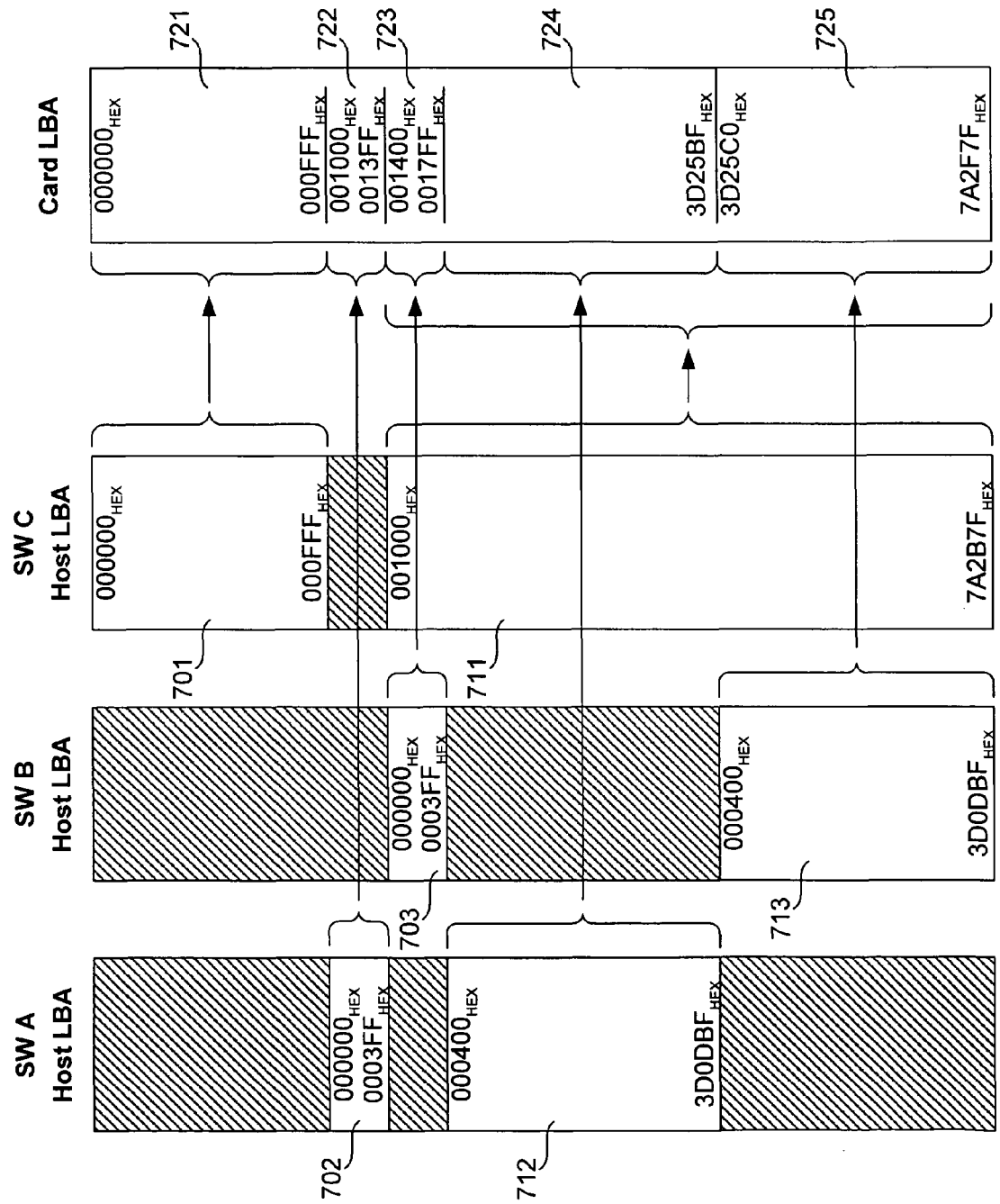
FIG. 7 is a diagram illustrating the logical addressing translation associated with the embodiment of FIG. 6.

FIG. 7 illustrates an alternate logical address to card logical address mapping that can also be used with a three position switch. The left column labeled SW A describes the mapping when the switch is in position A. Region 702, containing host addresses $000000_{HEX}$ through $0003FF_{HEX}$ map into region 722 containing Card LBA's $001000_{HEX}$ through $0013FF_{HEX}$. This region is where the FAT-16 system information is stored. When the switch is in position B, the second column labeled SW B shows that region 703 containing the FAT-16 system information for this volume maps into region 723 containing Card LBA's $001400_{HEX}$ through $0017FF_{HEX}$. Similarly the data region 712 selected when the switch is in position A maps to Card LBA region 724, and data region 713 selected when the switch is in position B maps to Card LBA region 725. Note that since all of these are distinct regions in the Card LBA mapping, system data and user data for both volumes can coexist at the same time and the switch can be moved between position A and position B and back to position A without loss of data.

When the switch is in position C supporting a FAT-32 file system, the host mapping is shown in the column labeled SW C. Region 701 containing host addresses $000000_{HEX}$ through $000FFF_{HEX}$ map into region 721 containing Card LBA's $000000_{HEX}$ through $000FFF_{HEX}$. The user data region 711, in this example extending from $001000_{HEX}$ through $7A2B7F_{HEX}$ maps into regions 723, 724 and 725.

One enhancement to this other embodiment is to have firmware assign the initial logical address space for the first and third volumes to different physical locations. The advantage of this enhancement allows the memory card to leave the factory with both FAT-16 and FAT-32 formats, thus being suitable for use by both newer and legacy systems and not requiring customer formatting.

The integrated circuit packages according to the invention can be used in memory systems. The invention can further pertain to an electronic system that includes a memory system as discussed above. Memory systems are commonly used to store digital data for use with various electronics products. Often, the memory system is removable from the electronic system so that the stored digital data is portable. These memory systems can be referred to as memory cards. The memory systems according to the invention can have a relatively small form factor and can be used to store digital data for electronics products such as cameras, hand-held or notebook computers, network cards, network appliances, set-top boxes, hand-held or other small audio players/recorders (e.g., MP3 devices), and medical monitors. Examples of a memory card include PC Card (formerly PCMCIA device), Flash Card, Secure Digital (SD) Card, Multimedia Card (MMC card), and ATA Card (e.g., Compact Flash card). As an example, the memory card can use Flash type or EEPROM type memory cells to store the data. More generally, a memory system can pertain to a memory card (including a memory stick) or some other semiconductor memory product.

The advantages of the invention are numerous. Different embodiments or implementations may yield one or more of the following advantages. One advantage of the invention is that a memory system can be used in a host device using 16-bit or 32-bit addressing. Another advantage of the invention is that automatic detection of the file format mitigates user errors and protects previously stored data. Still another advantage of the invention is that high density memory systems can be used in not only modern electronic products (using 32-bit addressing) but also legacy products (using 16-bit addressing).

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for operating a memory card that includes 1) a host controller configured to communicate with a host device, 2) at least an initial volume and 3) a switch wherein the memory card provides non-volatile data storage having an address space defined by a contiguous range of addresses, the method in the host controller comprising:

(a) retrieving volume information from the initial volume stored in a range of addresses that is a part of the contiguous range of addresses that defines the address space;
(b) determining, based on the volume information, whether the initial volume uses a 16-bit addressing, uses greater than the 16-bit addressing or uses less than the 16-bit addressing;
(c) when said determining (b) determines the initial volume uses greater than the 16-bit addressing, by-passing a switch position of the switch, determining the memory card uses 32-bit addressing and communicating to the host via the host controller to use the memory card as a single volume using 32-bit addressing and; and
(d) when said determining (b) determines that the initial volume uses the 16-bit addressing or uses less than the 16-bit addressing,
  (1) reading the switch position of the switch on the memory card wherein the switch position of the switch is only used when the host controller determines 16-bit addressing or less is used;
  (2) determining an address offset for the address space based on upon the switch position wherein the address offset corresponds to one of a plurality of volumes in which the memory card is partitioned;
  (3) communicating to the host device via the host controller to use the volume of the memory card indicated by the switch position and the address offset.

2. A method as recited in claim 1,
wherein the switch has at least a first position and a second position,
wherein, when the switch position is in the first position and the memory card is operated by dividing the address space of the non-volatile data storage into the plurality of volumes, the first volume of the non-volatile data storage is accessed, and
wherein, when the switch position is in the second position and the memory card is operated by dividing the address space of the non-volatile data storage into the plurality of volumes, a second volume of the non-volatile data storage is accessed.

3. A method as recited in claim 2, wherein the memory card is formatted into either one of a single volume or a pair of volumes, the pair of volumes being the first volume and the second volume.

4. A method as recited in claim 3, wherein the total non-volatile data storage for the memory card is formatted into the first volume of X gigabytes as the single volume, or formatted into the first and second volumes of X/2 gigabytes each as the pair of volumes.

5. A method as recited in claim 1, wherein said method further comprises:
detecting activation of the memory card, and
wherein said retrieving (a) and said determining (b) are performed after said detecting detects the activation of the memory card.

6. A method as recited in claim 5, wherein the activation of the memory card occurs upon power-on of the memory card or upon insertion of the memory card into a host device.

7. A method as recited in claim 1,
wherein the memory card is formatted into a single volume or a plurality of volumes, and
wherein the total non-volatile data storage for the memory card is formatted into the first volume of X gigabytes as the single volume, or formatted into the N volumes of X/N gigabytes each as the plurality of volumes.

8. A method as recited in claim 1, wherein when said determining (b) determines the initial volume uses greater than the 16-bit addressing, initial volume has a FAT-32 file format.

9. A method as recited in claim 1, when said determining (b) determines that the initial volume uses the 16-bit addressing or uses less than the 16-bit addressing, each of the multiple volumes has a FAT-16 file format.

* * * * *